United States Patent [19]

Meyn

[11] 3,930,771

[45] Jan. 6, 1976

[54] APPARATUS FOR MANUFACTURING A DUAL SEAL INSULATOR

[75] Inventor: John E. Meyn, Anaheim, Calif.

[73] Assignee: Microdot Inc., South Pasadena, Calif.

[22] Filed: Aug. 5, 1974

[21] Appl. No.: 495,075

Related U.S. Application Data

[62] Division of Ser. No. 317,926, Dec. 26, 1972, Pat. No. 3,879,517.

[52] U.S. Cl. ................ 425/129 R; 249/83; 264/272; 264/273; 249/81; 264/135

[51] Int. Cl.[2] ............................................ B29D 3/00

[58] Field of Search........ 425/121, 129 R, 251, 292, 425/123; 249/63, 64, 83, 91, 95, 96, 97

[56] References Cited

UNITED STATES PATENTS

| | | | |
|---|---|---|---|
| 1,982,279 | 11/1934 | Apple | 425/129 R |
| 2,369,291 | 2/1945 | Frank et al. | 425/129 R X |
| 2,382,200 | 8/1945 | Brunner | 425/123 R |
| 2,983,958 | 5/1961 | Fay | 425/123 X |
| 3,254,372 | 6/1966 | Hofbauer | 425/129 R X |
| 3,543,337 | 12/1970 | Meyn | 425/129 R |
| 3,754,846 | 8/1973 | Choate | 425/129 R X |

FOREIGN PATENTS OR APPLICATIONS

| | | |
|---|---|---|
| 1,135,793 | 4/1968 | United Kingdom |

*Primary Examiner*—J. Howard Flint, Jr.
*Attorney, Agent, or Firm*—Harness, Dickey & Pierce

[57] ABSTRACT

An apparatus for making a dual seal insulator including an insert and a pair of elastomeric seals each united to one of the ends of the insert, wherein portions of the insert and the seals define a plurality of bores. The insulator is formed by mounting the insert in a mold to form a pair of mold cavities at each end of the insert and placing core pins in the bores of the insert so that they extend from the insert across the cavities. A keyway, disposed longitudinally on the circumference of the insert between the ends thereof, cooperates with the enclosure to define a passage between the mold cavities. An elastomeric material is pressed into one of the cavities so that a portion of the material is forced through the passage into the other of the cavities. In this manner, the pair of elastomeric seals is simultaneously molded at opposite ends of the insert. The insulator is then cured and removed from the enclosure and the core pins are extracted from the bores. The invention includes the apparatus for manufacturing the article which constitutes the dual seal insulator.

7 Claims, 4 Drawing Figures

APPARATUS FOR MANUFACTURING A DUAL SEAL INSULATOR

CROSS REFERENCES TO RELATED APPLICATIONS

This is a divisional application of application Ser. No. 317,926, filed on Dec. 26, 1972 now U.S. Pat. No. 3,879,517, for METHOD FOR MAKING A DUAL SEAL INSULATOR FOR MULTIPLE CONDUCTOR CONNECTORS.

BACKGROUND OF THE INVENTION

1. Field of the Invention

This invention relates generally to apparatus for molding seals on opposite ends of an insert to form an insulator for use in multiple conductor connectors.

2. Description of the Prior Art

Multiple conductor electrical connectors are used for providing continuity between associated conductors in a pair of multiple conductor cables. Each of the connectors includes a pair of opposing registerable portions which are individually connected to the end of one of the pair of cables. The opposing portions each have included an encasing member and an insert disposed therein. A grommet seal has been united with the forward end of the insert and a wafer seal has been united with the rearward end of the insert.

The insert in combination with the grommet seal and the wafer seal form a dual seal insulator having a plurality of bores extending longitudinally with the respective cable. A plurality of control elements are connected individually to one of the conductors and resiliently fixed within an associated one of the bores by the grommet seal. The wafer seal provides an insulating face at the rear of the insulator.

Multiple conductor insulators having an insert united with a grommet seal have been fabricated in accordance with a method disclosed by John E. Meyn in U.S. Pat. No. 3,525,786 and assigned of record to the assignee of record of the present application. That patent discloses the mounting of a multiplebore insert in a first mold wherein a first mold cavity is defined at one end of the insert. A multiplicity of core pins are placed into each of the bores of the insert to extend across the mold cavity. One of the ends of the insert is coated with uncured thermal setting adhesive and, with the mold heated, an uncured elastomeric material is forced under heat and pressure into the first mold cavity to form the grommet seal around the core pins. By curing the elastomeric material and the insert under pressure, the seal is bonded to the face of the insert.

In cases where it has been desirable to have a seal at both ends of the insert, the process has been repeated. Thus, the insert has been mounted in a second mold which forms a second mold cavity with the opposite end of the insert, and the core pins extend across the second mold cavity. The opposite end of the insert is coated with the uncured thermal setting adhesive and the elastomeric material is extruded under heat and pressure into the second mold cavity to form a second seal.

It can be appreciated that it is desirable to unite the insert with the grommet and wafer seals in a subassembly which provides for the alignment of the bores within the insulators and seals. However, the formation of a seal at each end of the insulator has called for an iteration of each step in the process. For this reason, the fabrication of the composite bodies has been relatively time consuming and expensive. It is desirable to equalize the bonding of the seals to the insert but it has been difficult to maintain identical molding pressures in the separate molding operation. Furthermore, since separate molds have been used to form each of the seals, there has been an additional burden in cleaning the molds.

SUMMARY OF THE INVENTION

The foregoing deficiencies of the prior art have been overcome by the present invention which provides for the simultaneous molding of the first and second seals. An insert having multiple bores extending longitudinally between its ends is provided with keyways spaced on the circumference of the insert to maintain its radial alignment within a connector. The insert is enclosed in a mold so that a first mold cavity is defined at one end of the insert and a second mold cavity is defined at the other end of the insulator. Contact elements can be mounted in at least some of the bores of the insert to extend through the first and second mold cavities.

A passage which is defined at least in part by the insert connects the first mold cavity with the second mold cavity. As an elastomeric material is extruded under heat and pressure into one of the mold cavities, a portion of the material is forced through the passage into the other mold cavity whereby the seals are molded simultaneously. A longitudinal recess in the wall of the mold can combine with the side of the insert to define the passage between the first and second mold cavities. However, the passage is desirably provided by the keyways which extend longitudinally between the ends of the insert.

It will be noted that the temperature and pressure which accompanies the extruding of the elastomeric material is the same for each of the seals so that the seals have identical bonding characteristics. Also, since the dual seal insulators can be formed using a single mold, there is less of an investment in equipment. Furthermore, since the two seals are molded simultaneously, there is only one cleanup operation. Of particular importance is the savings in time which can result from simultaneously molding the grommet and the wafer seals. For example, the simultaneous molding process typically provides a 40 percent savings in time over the processes of the prior art.

Further features of the invention will appear from the following description in which the preferred embodiments of the invention have been set forth in detail in conjunction with the accompanying drawings.

DESCRIPTION OF PREFERRED EMBODIMENTS

Figure 1:
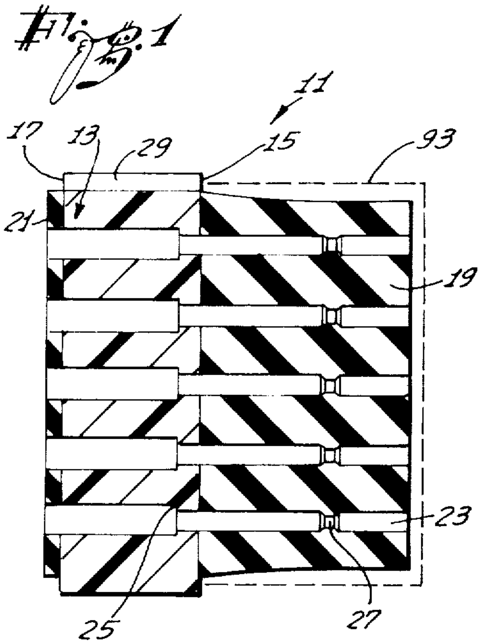
FIG. 1 is a side elevational view of the presently preferred embodiment of the dual seal insulator, the view being in cross section through the axis of the composite body.

The concepts of this invention can be embodied in the configuration shown in FIG. 1 wherein a dual seal insulator is shown generally at 11. The dual seal insulator is a composite body including an insert 13, a grommet seal 19, and a wafer seal 21. The insert 13 is defined in part by a first end face 15 and a second end face 17. The grommet seal 19 is preferably bonded to the first end face 15, and the wafer seal 21 is preferably bonded to the second end face 19 to form a composite body with the insert 13.

The insert 13 can be a rigid body having insulating properties which is preferably made of a thermal setting resin such as epoxy reinforced by glass fibers. In addition, materials such as diallyl phthalate, melamine, phenol, formaldehyde, resin, and alkyd molding compounds can be used to form the insert 13. The grommet and wafer seals 19 and 21 are preferably made of silicone rubber but other commonly known elastomers may be used such as butyl, nitrile, neoprene, SBR, EPR, or natural rubber.

The dual seal insulator 11 has a plurality of bores, such as the bore 23, which extend longitudinally through the insert 13 and the seals 19 and 21. The bore 23 can include a shoulder 25 defined by the insert 13 and providing the bore 23 with a step configuration having a larger diameter in the wafer seal 21 and a smaller diameter in the grommet seal 19. In addition, the bore 23 can include a circumferential restriction 27 in the elastomeric material forming the grommet seal 19. By virtue of the resilient yieldability of the elastomeric material, the circumferential restriction 27 functions in the manner of an O-ring. Thus, in a multiple conductor electrical connector, a contact element having an enlarged shank narrowing to form a pin can be inserted into the bore 23 so that the shank abuts the shoulder 25 and the circumferential restriction 27 creates a seal with the pin of the contact element. It can be appreciated that the circumferential restriction 27 also functions to yieldably retain the contact element within the associated bore 23.

Figure 2:
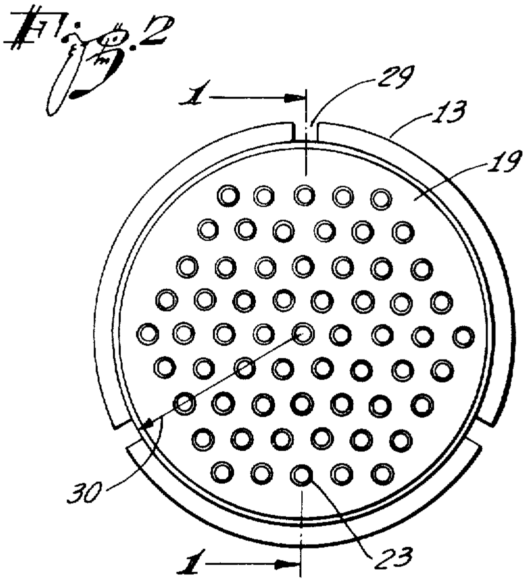
FIG. 2 is a front elevational view of the embodiment shown in FIG. 1.

A frontal view of the dual seal insulator 11 and the bores 23 is shown in FIG. 2. A plurality of slots such as the keyways 29 are longitudinally disposed at the circumference of the insulator 13 on an inside radius 30. Each of the keyways 29 cooperates with an associated key in the connector (not shown) to maintain the angular disposition of the dual seal insulator 11 within the connector.

To carry out the contemplated method of fabrication the insert 13 can be molded in advance and its end faces 15 and 17 coated with an adhesive primer that is compatible with the materials used in the insert 13 and the seals 19 and 21. For example, in the preferred embodiment wherein the insert 13 is formed of an epoxy material and the seals are formed from a silicone rubber, the adhesive primer can include the following ingredients and parts by weight:

| | |
|---|---|
| Diallyl phthalate | 90 |
| Diallyl phthalate monomer | 10 |
| Tertiary butyl perbenzoate | 5 |
| Toluol | 150 |
| Methyl ethyl ketone | 50 |

Desirably, two coats of adhesive primer are applied to each of the end faces 15 and 17, and the first coat is cured by baking at a temperature of 300°F for 15 minutes.

Figure 3:
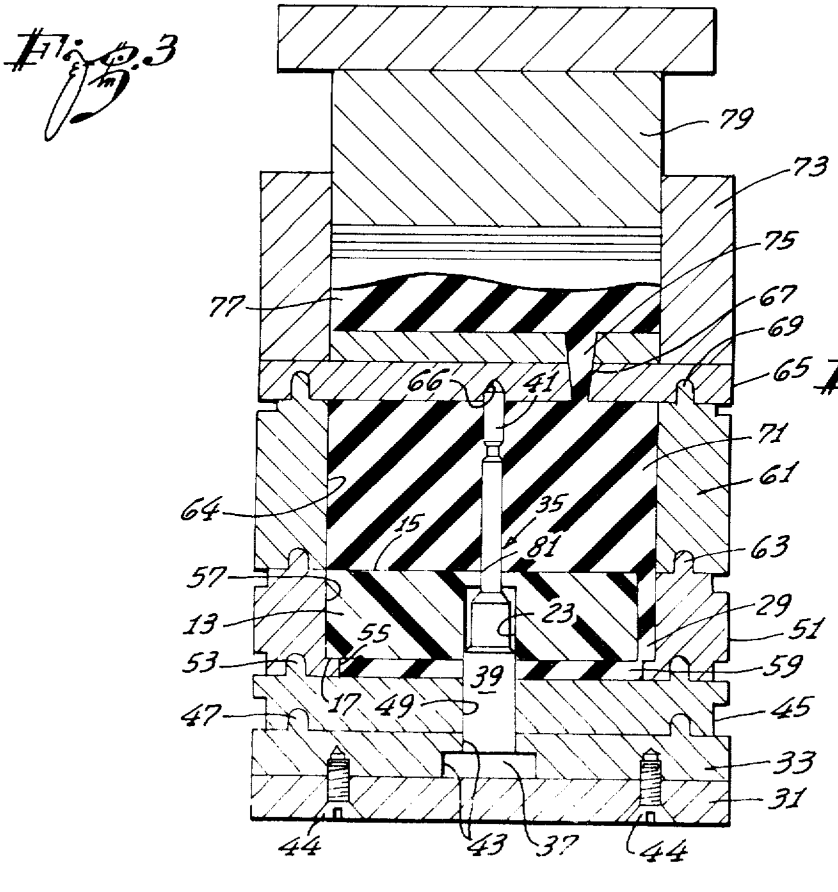
FIG. 3 is a sectional view of apparatus which may be employed for the molding of the dual seal insulator shown in FIGS. 1 and 2, wherein the area of the bore and the pin is substantially enlarged.

Further fabrication of the dual seal insulator 11 can be accomplished by use of a mold apparatus such as that shown in FIG. 3. A base plate 31 and a pin plate 33 cooperate to loosely hold a plurality of contact elements such as the contact element shown generally enlarged at 35. For the purpose of illustration the single contact element 35 is shown in FIG. 3 it being understood that there can be a contact element for each of the bores 23 in the insert 13. The contact element 35 is provided with a ferrule 37, a shank 39, and a pin 41 which have progressively smaller diameters. The pin plate 33 is provided with a bore 43 for each of the contact elements 35, the bore 43 having a larger diameter in contact with the base plate 31 and a smaller diameter in contact with the shank 39. The contact elements 35 can be mounted in the bores 43 and the pin plate 33 fixed to the base plate 31 by a multiplicity of screws 44.

An ejection plate 45 can be aligned with the pin plate 33 by the use of a plurality of dowel pins 47. The ejection plate 45 can be provided with a bore 49 in substantially close relationship with each of the contact elements 35.

A first cylinder 51 can be aligned with the ejection plate 45 by the use of dowel pins 53. In the preferred embodiment, the first cylinder 51 is provided with first wall portion 55 of relatively smaller diameter extending from the ejection plate 45, and second wall portions 57 of relatively larger diameter extending from the first wall portions 55.

In the preferred method of operating the apparatus shown in FIG. 3, the insert 13 is mounted over the contact elements 35 to occupy that portion of the cylinder 51 defined by the second wall portions 57. In this manner a first mold cavity 59 is defined by the end face 17 of the insert 13, the first wall portions 55, and the ejection plate 45. With the insert 13 mounted over the contact elements 35, the shanks 39 of each of the contact elements 35 extend from the pin plate 33, across the first mold cavity 59 and into the insert 13. In this manner, the contact elements 35 define interstices among the shanks 39 within the first cavity 59. The radius of the first wall portion 55 is preferably less than the radius of the second wall portion 57 but greater than the inside radius 30 (FIG. 2) of the keyways 29. With this configuration, each of the keyways 29 will provide a passage into the first mold cavity.

A second cylinder 61 can be seated on the cylinder 51 and aligned therewith by the use of dowel pin 63. The second cylinder 61 can be provided with a cylindrical inner surface 64 concentric with the first and second wall portions 55 and 57, respectively, and having a diameter substantially equivalent to the diameter of the second wall portions 57.

A top plate 65 can be mounted on a plurality of dowel pins 69 which extend from the second cylinder 61. In this manner, a second mold cavity 71 is defined by the top plate 65, the inner surface 64 of the second cylinder 61, and the first end face 15 of the insert 13. The top plate 65 can be provided with an opening 67 extending into the second mold cavity 71 and a plurality of recesses 66 each receiving the head 41 of one of the contact elements 35. With the insert 13 disposed over the contact elements 35, the heads 41 of the contact elements 35 extend from the insert 13, across the second mold cavity 71, into the recesses 66. In this manner, the contact elements 35 define interstices among the heads 41 within the second mold cavity 71. It can be appreciated that since the inside radius of the keyways 29 is less than the radius of either the first mold cavity 51 or the second mold cavity 71, the keyways 29 provide a passage between the cavities 51 and 71.

A pot 73 having an opening 75 in the base thereof can be placed on the top plate 65 so that the opening 67 and the opening 75 align to form a sprue. The pot 73 can be charged with an elastomeric material 77 and provided with a ram 79 capable of forcing the material 77 through the openings 75 and 67 into the second mold cavity 71 to form the grommet seal 19. With the keyways 29 each providing a passage between the second mold cavity 71 and the first mold cavity 51, a portion of the elastomeric material 77 will extend through the keyways 29 into the first mold cavity 51 to form the wafer seal 21. In this manner the grommet and wafer seals 19 and 21 respectively can be simultaneously molded under the same temperature and pressure, and with the same molding apparatus.

Figure 4:
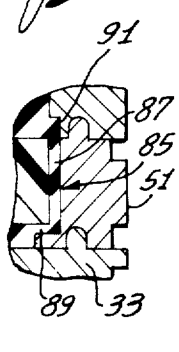
FIG. 4 illustrates a fragmentary sectional view of another apparatus that may be employed for the molding of the dual seal insulator.

It can be appreciated that other means for providing a passage between first and second mold cavities 59 and 71 respectively can comprise a plurality of longitudinal recesses one of which is shown generally at 85 in FIG. 4. In this embodiment the second wall portions 57 are slotted to define a first portion 87 of the longitudinal recess 85 which combines with a portion of the circumferential surface of the insert 13 to form a passage beside the insert 13. A second portion 89 of the longitudinal recess 85 is defined by the second end face 17 and the first wall portions 55 to provide the passage with access to the first mold cavity 59. A third portion 91 of the longitudinal recess 85 can comprise a slot in the inner surface 64 of the second cylinder 61. The third portion 91 provides the passage with access to the second mold cavity 71. This embodiment of the mold apparatus is preferred when the insert 13 does not include keyways 29.

In either of the foregoing embodiments, each of the bores 23 in the insert 13 is occupied by a portion of one of the contact elements 35. To prevent the elastomeric material 77 from entering the bores 23 of the insert 13, it is desirable to maintain relatively close tolerances at least where the contact elements 35 enter and leave the insert 13. For example, the pins 41 of the contact elements 35 can be provided with a radius 0.0003 inches less than the radius of the bores 23 to establish a shut off point 81 where the pins extend from the insert 13 into the second cavity 71. Similarly, the shanks 39 of the contact elements 35 can be provided with a radius 0.0003 inches less than the radius of the bores 23 to establish a shut off point 83 where the shank 39 extends from the insert 13 into the first cavity 51.

In the preferred embodiment an initial downward pressure by the ram 79 of 700 pounds per square inch will cause a portion of the elastomeric material 77 to pass through the second mold cavity 71 and the keyways 29 into the first mold cavity 59. After the cavities 71 and 59 have been filled, the pressure applied by the ram 79 can be increased to 1000 pounds per square inch for approximately 15 seconds. At the end of this period of time the ram 79 can be allowed to drift for a cure period of approximately 5 minutes after which the first cylinder 51 and the second cylinder 61 can be removed from the insulator 11. Then insulator 11 can be baked at a temperature such as of 350°F for a final cure period of approximately 8 hours. Finally, the dual seal insulator 11 can be removed from the contact elements 35 by lifting the ejection plate 45 from the pin plate 33.

During the final cure period, the elastomeric material will shrink to the desired tapered configuration shown best in FIG. 1 from the dimensions of the second mold cavity 71 shown by dotted lines 93. The diameter of bores 23 will not shrink, however, due to the presence of the contact elements 35 within the bores 23 during the cure period.

It can be appreciated that this method and apparatus for fabricating the dual seal insulator 11 offers significant advantages over the methods and molding apparatus of the prior art. A significant advantage is associated with the simultaneous fabrication of the grommet seal 19 and the waver seal 21 which can provide a savings in time of approximately 40 percent. The savings in time can be accounted for in part by the fact that only a single fabricating apparatus need be cleaned after the insulator 11 is fabricated.

Furthermore, the prior art methods of molding relied upon different molds for each of the seals 19 and 21. Thus, the single mold disclosed herein provides a significant savings in molding. Only a single pot need be charged with the elastomeric material 77 and a single charge can be sufficient to fill both of the mold cavities 59 and 71.

These savings in time and equipment can be realized without significantly altering the configuration of the insert 13. The keyways 29 which are relied upon to maintain the configuration of the composite body 11 within the connector can provide passage means for connecting the first mold cavity 59 with the second mold 71. By using the existing keyways 29 as disclosed herein, the grommet and the wafer seals 19 and 21, respectively, can be molded simultaneously.

It can also be appreciated that the pressure which is applied to the elastomeric material 77 will be the same for the grommet seal 19 and the wafer seal 21 if they are simultaneously fabricated. This can assure greater uniformity in the bonding of the seals 19 and 21 to the insert 13. In this way, the grommet seal 19 and the wafer seal 21 will be maintained in firmly bonded relationship with the insert 13 even when considerable forces such as shear forces are applied to the seals.

Although this application has been disclosed and illustrated with reference to a particular embodiment, the principles involved are susceptible of numerous other applications which will be apparent to persons skilled in the art. The invention is therefore to be limited only as indicated by the scope of the appended claims.

I claim:

1. An apparatus for simultaneously molding a seal on each end of a plastic insert having first and second end faces and multiple bores extending therebetween; first means cooperating with the first end face to define a first cavity shaped to the configuration desired for one of the seals; said first means cooperating with the second end face to define a second cavity shaped to the configuration desired for another of the seals; second means for sealing the bores in the insert which are of two different diameters, the ends of said second means of one diameter extending across the first cavities, the ends of said second means of the other diameter extending across said second cavities, and third means for pressing a curable elastomeric material into the first cavity to occupy the area about said second means therein; the edge of the insert has at least one passage between the first and second cavities.

2. An apparatus as recited in claim 1 wherein the insert has at least one portion which defines at the periphery of the insert at least one longitudinal recess extending between the end faces thereof, the portion cooperating with the first means to define the passage between and communicating with the first and second cavities.

3. A combination as recited in claim 2 wherein a plurality of longitudinal recesses are provided in the edge of the insert to form a plurality of passageways which function as keyways which orient the insert in a connector.

4. The apparatus as recited in claim 1 wherein the first means comprises:

first wall portions in substantial contact with the circumference of the insert;

second wall portions extending from the first wall portions to at least partially define the first mold cavity;

third wall portions extending from the first wall portion to at least partially define the second mold cavity;

the first wall portions including at least one longitudinal recess which cooperates with the insert to at least partially define the passage.

5. In an apparatus for simultaneously molding at least first and second seals into a multiple bore insert, mold means having characteristics for enclosing the insert and cooperating with the insert to define first and second cavities; a multiplicity of like contact elements having the forward and rearward ends of different diameter for sealing the top and bottom edges of the bores in the insulator and with the ends of one diameter extending across the first said cavities, and the ends of the other diameter extending across the second cavities; means for charging the first cavities with a curable elastomeric material whereby the material fills the spaces among the contact elements in the first cavity to form the first seal; the insert having portions which at least partially define a plurality of passages extending from the first cavity into the second cavity whereby the charging of the first cavity forces a portion of the material through the passages into the second cavity to form the second seal having apertures of different diameter in the elastomeric material at opposite ends of the insert.

6. An apparatus as recited in claim 5 wherein the mold means comprises:

first wall portions shaped in the configuration the first seal and cooperating with the insert to form the first cavity;

second wall portions shaped in the configuration of the second seal and cooperating with the insert to form the second cavity; and third wall portions disposed between the first and second wall portions and in juxtaposition to the insert, said third wall portions cooperating with the insert to define the passages.

7. An apparatus for receiving a multiple bore rigid insert and molding a seal onto each of the ends thereof, comprising: first wall portions configured to contact the edge of an insert; second wall portions cooperating with one end of said insert to define a first mold cavity; third wall portions cooperating with another end of said insert to define a second mold cavity; a plurality of contact elements having one end of greater diameter than the other, the ends of different diameters sealing the top and bottom ends of the insert bores; the ends of the contact elements of smaller diameter extending across the first mold cavity, the ends of the contact elements of greater diameter extending across the second mold cavities.

* * * * *